(12) United States Patent
Yanaka et al.

(10) Patent No.: US 11,945,504 B2
(45) Date of Patent: Apr. 2, 2024

(54) VEHICLE

(71) Applicant: TOYOTA JIDOSHA KABUSHIKI KAISHA, Toyota (JP)

(72) Inventors: Akihiro Yanaka, Nagoya (JP); Shinji Kurachi, Kariya (JP); Tetsuji Shibata, Kariya (JP); Yoshinori Ikegami, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 47 days.

(21) Appl. No.: 17/531,004

(22) Filed: Nov. 19, 2021

(65) Prior Publication Data

US 2022/0161856 A1 May 26, 2022

(30) Foreign Application Priority Data

Nov. 25, 2020 (JP) ................. 2020-194990

(51) Int. Cl.
*B62D 21/15* (2006.01)
*B62D 25/20* (2006.01)
(Continued)

(52) U.S. Cl.
CPC ............. *B62D 21/15* (2013.01); *B62D 25/20* (2013.01); *B60K 1/04* (2013.01); *B60Y 2306/01* (2013.01);
(Continued)

(58) Field of Classification Search
CPC ...... B62D 21/15; B62D 25/20; B62D 25/082; B62D 21/03; B62D 21/155; B62D 21/02;
(Continued)

(56) References Cited

U.S. PATENT DOCUMENTS 6,308,412 B1 * 10/2001 Christofaro .......... B21D 39/044
29/897.2
6,623,020 B1 * 9/2003 Satou ..................... B62D 21/11
280/124.109
(Continued)

FOREIGN PATENT DOCUMENTS

JP        H11078966 A    3/1999
JP        2016-052829 A    4/2016
(Continued)

*Primary Examiner* — Amy R Weisberg
*Assistant Examiner* — Dana D Ivey
(74) *Attorney, Agent, or Firm* — Dinsmore & Shohl LLP

(57) ABSTRACT

A vehicle includes a vehicle body and a mounted component provided in the vehicle body. The vehicle body includes a pair of side member, a first crossmember, a second crossmember, and a bracket. The side members extend in the vehicle front-rear direction, and the side members are provided on the opposite sides across the mounted component in the vehicle right-left direction when the side members are viewed from above in the vehicle up-down direction. The first crossmember extends in the vehicle right-left direction such that the first crossmember is joined to surfaces of respective inner walls of the side members. The second crossmember extends in the vehicle right-left direction at a position closer to the mounted component than the first crossmember such that the second crossmember penetrates through the respective inner walls. The mounted component is connected to the first crossmember and the second crossmember via the bracket.

6 Claims, 3 Drawing Sheets

(51) Int. Cl.
*B60K 1/04* (2019.01)
*B62D 21/02* (2006.01)
*B62D 21/03* (2006.01)
*B62D 25/08* (2006.01)

(52) U.S. Cl.
CPC .............. *B62D 21/02* (2013.01); *B62D 21/03* (2013.01); *B62D 21/155* (2013.01); *B62D 25/082* (2013.01)

(58) Field of Classification Search
CPC .... B62D 21/152; B60Y 2306/01; B60K 1/04; B60K 5/1275; B60K 1/00; B60K 5/00; B60K 2001/0438; B60K 5/12
USPC .... 296/187.08, 204, 203.02, 203.03, 203.04; 280/781
See application file for complete search history.

(56) References Cited

U.S. PATENT DOCUMENTS

| | | | | |
|---|---|---|---|---|
| 7,588,117 | B2 * | 9/2009 | Fukuda | ................ B62D 21/155 180/291 |
| 8,851,223 | B2 * | 10/2014 | Yamashita | ............... B60K 1/00 180/300 |
| 10,053,153 | B2 * | 8/2018 | Kobayashi | .............. B60L 50/66 |

FOREIGN PATENT DOCUMENTS

| | | | | |
|---|---|---|---|---|
| JP | 2020-082789 A | | 6/2020 | |
| JP | 2020082789 A | * | 6/2020 | |
| WO | WO-2014097513 A1 | * | 6/2014 | ............... B60K 1/00 |

\* cited by examiner

VEHICLE

CROSS-REFERENCE TO RELATED APPLICATION

This application claims priority to Japanese Patent Application No. 2020-194990 filed on Nov. 25, 2020, incorporated herein by reference in its entirety.

BACKGROUND

1. Technical Field

The technology described in the present specification relates to a vehicle. The technology particularly relates to a vehicle including a vehicle body and a mounted component provided in the vehicle body.

2. Description of Related Art

Vehicles traveling on a road surface may have collisions from various directions such as a front end collision, a rear end collision, and a side collision. From this point, it is demanded to reduce damage to a mounted component in a vehicle body of a vehicle at the time when the vehicle has a collision. For example, Japanese Unexamined Patent Application Publication No. 11-078966 (JP 11-078966 A) describes a conventional vehicle body. The vehicle body includes, as a frame structure for a vehicle-body front part, a pair of side members, a first crossmember (referred to as a front crossmember in JP 11-078966 A), and a second crossmember (referred to as a second crossmember in JP 11-078966 A). The first crossmember is placed in front of the second crossmember in the vehicle front-rear direction. The first and second crossmembers are joined to the side members by penetrating through respective inner walls of the side members.

SUMMARY

In the vehicle body described above, the two crossmembers penetrate through the inner walls of the side members, so that the two crossmembers are firmly connected to the side members. Accordingly, by use of the two crossmembers, it is possible to firmly hold a mounted component. For example, it is possible to restrain displacement and vibration of the mounted component. However, in a case where the vehicle body has a front end collision and a collision load is applied to the vehicle body, for example, deformation of the side members may be restrained unintentionally by the two crossmembers thus firmly connected, so that collision energy may not be absorbed sufficiently. With all the above things considered, the present specification provides a technology to allow deformation of a vehicle body at the time when a vehicle has a collision and to firmly hold a mounted component at the time when the vehicle is traveling.

The technology described in the present specification is embodied in a vehicle. The vehicle includes a vehicle body and a mounted component provided in the vehicle body. The vehicle body includes a pair of side member, a first crossmember, a second crossmember, and a bracket. The side members extend in the vehicle front-rear direction, and the side members are provided on the opposite sides across the mounted component in the vehicle right-left direction when the side members are viewed from above in the vehicle up-down direction. The first crossmember extends in the vehicle right-left direction such that the first crossmember is joined to surfaces of respective inner walls of the side members. The second crossmember extends in the vehicle right-left direction at a position closer to the mounted component than the first crossmember such that the second crossmember penetrate through the respective inner walls. The mounted component is connected to the first crossmember and the second crossmember via the bracket.

In the vehicle, the mounted component is held by use of two crossmembers. Out of the two crossmembers, the second crossmember placed near the mounted component penetrates through the inner walls of the side members, so that the two crossmembers are firmly connected to the side members. Hereby, the rigidity of the vehicle body including the second crossmember is improved, and the mounted component can be firmly held at the time when the vehicle is traveling. In the meantime, the first crossmember placed apart from the mounted component does not penetrate through the inner walls of the side members, and the first crossmember is joined to the surfaces of the inner walls. That is, the connection strength of the first crossmember to the side members is restrained as compared to the second crossmember. Hereby, the strength of the vehicle body can be reduced intentionally at a position distanced from the mounted component. With such a configuration, when the vehicle has a collision and the vehicle body is to deform toward the mounted component, it is possible to absorb collision energy without disturbing deformation of the vehicle body at the position where the first crossmember is provided. In the meantime, since deformation of the vehicle body is restrained at the position where the second crossmember is provided, the mounted component is protected, and the deformation of the vehicle body is promoted at the position where the first crossmember is provided. Accordingly, it is possible to absorb more collision energy. As such, in the vehicle described in the present specification, the connection strengths of the two crossmembers with the side members are set to different from each other. As a result, while deformation of the vehicle body is allowed at the time of a collision, the mounted component can be firmly held at the time when the vehicle is traveling.

Technical details described in the present specification and further improvements thereof are described in "DETAILED DESCRIPTION OF EMBODIMENTS".

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
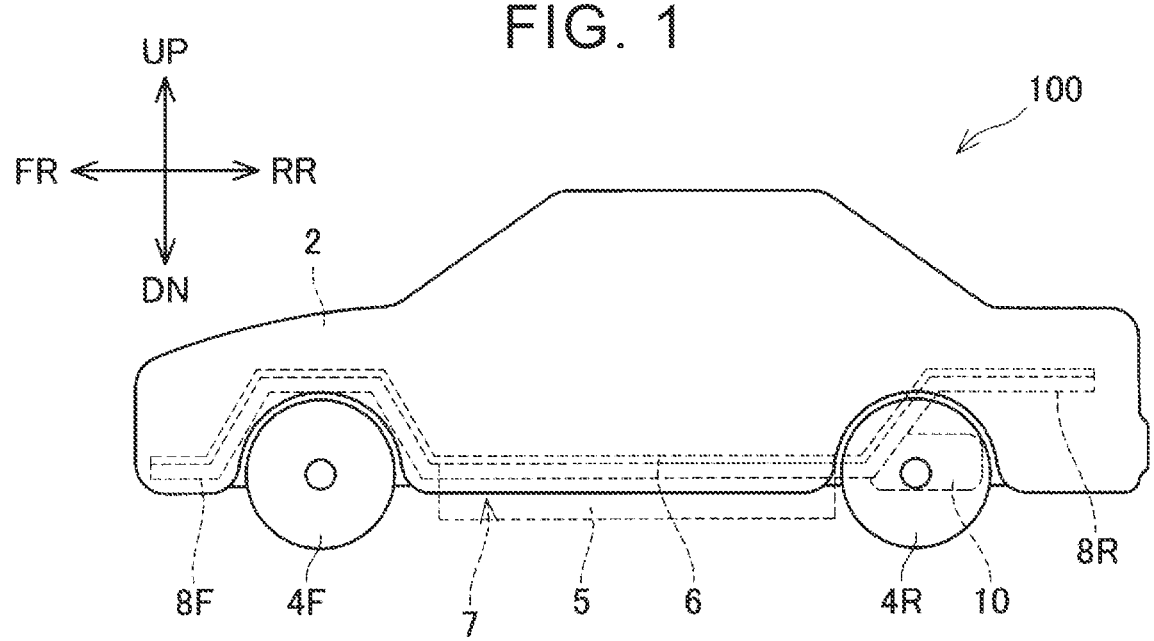
FIG. 1 schematically illustrates a side view of a vehicle according to an embodiment.

In one aspect of the technology, the second crossmember may extend to respective outer walls of the side members such that the second crossmember is joined to the respective outer walls. This allows the second crossmember to be further firmly connected to the side members.

In one aspect of the technology, the second crossmember may be made of a pipe material. Hereby, the second crossmember can be relatively easily molded.

In one aspect of the technology, the first crossmember may be made of a pipe material. Hereby, the first crossmember can be relatively easily molded.

In one aspect of the technology, the side members may be provided as a pair of rear side members placed in a rear part of the vehicle, and the mounted component may be a motor configured to drive the vehicle. However, in another aspect, the side members may be provided as front side members placed in a front part of the vehicle. In this case, the mounted component may be a motor or an engine.

In one aspect of the technology, the vehicle body may further include a third crossmember extending in the vehicle right-left direction in front of the motor in the vehicle front-rear direction such that the side members are connected to each other via the third crossmember. With such a configuration, the motor can be fixed more firmly by providing the third crossmember at a position that has little influence on deformation of the vehicle body at the time of a rear end collision.

In one aspect of the technology, the third crossmember may be made of a pipe material and may be provided to penetrate through the respective inner walls. Hereby, the third crossmember can be relatively easily molded, and the third crossmember can be more firmly joined to the side members.

In one aspect of the technology, each of the side members may include an inclined area that is an area inclined upward toward the rear side in the vehicle front-rear direction. In this case, the third crossmember may be placed in front of the inclined area in the vehicle front-rear direction, and the second crossmember may be place behind the inclined area and placed above the motor. The first crossmember may be placed behind the second crossmember in the vehicle front-rear direction. With such a configuration, when the vehicle has a rear end collision, the side members easily deform forward in the vehicle front-rear direction due to the inclined areas. As a result, energy at the collision can be easily absorbed.

With reference to the drawings, a vehicle of an embodiment will be described. First, with reference to FIG. 1, a vehicle 100 of the embodiment will be described. Although the vehicle 100 is not limited in particular, the vehicle 100 is a so-called electric vehicle and is a vehicle traveling on a road surface by electric power. Here, a direction FR in the drawings indicates the front side in the front-rear direction (the longitudinal direction) of the vehicle 100, and a direction RR indicates the rear side in the front-rear direction of the vehicle 100. Further, a direction LH indicates the left side in the right-left direction (the width direction) of the vehicle 100, and a direction RH indicates the right side in the right-left direction of the vehicle 100. A direction UP indicates the upper side in the up-down direction (the height direction) of the vehicle 100, and a direction DN indicates the lower side in the up-down direction of the vehicle 100. Note that, in the present specification, the front-rear direction, the right-left direction, and the up-down direction of the vehicle 100 may be just referred to as the front-rear direction, the right-left direction, and the up-down direction.

As illustrated in FIG. 1, the vehicle 100 includes a vehicle body 2, a motor 10, a battery 5, and a plurality of wheels 4f, 4r. The wheels 4f, 4r are rotatably attached to the vehicle body 2. The wheels 4f, 4r include a pair of front wheels 4f and a pair of rear wheels 4r. Note that the number of the wheels 4f, 4r is not limited to four.

The vehicle body 2 includes a floor panel 6 and a pair of side members 7. The floor panel 6 is a sheet metal part extending in the front-rear direction. The floor panel 6 constitutes a floor of a passenger compartment of the vehicle 100. The side members 7 are placed below the floor panel 6 and extend in the front-rear direction along the floor panel 6. The side members 7 are constituted by two side members provided on the opposite sides in the right-left direction (that is, a direction from the near side to the deep side on the plane of paper of FIG. 1) and extending in the front-rear direction. The battery 5 is placed between the side members 7. The side members 7 include a pair of front side members 8F placed in a front part of the vehicle 100, and a pair of rear side members 8R placed in a rear part of the vehicle 100.

The motor 10 is provided below the rear side members 8R. The motor 10 is a device configured to drive the vehicle 100 and is electrically connected to the battery 5. The motor 10 drives the vehicle 100 by electric power stored in the battery 5. Further, the motor 10 also functions as a generator using regenerative energy of the vehicle 100.

With reference to FIGS. 2 to 6, a structure of the rear part of the vehicle body 2 will be described. Note that, as has been described earlier, the rear side members 8R, the motor 10, and so on are placed below the floor panel 6 (that is, on the deep side on the plate of paper of FIG. 2). However, in order to help understanding, these members are illustrated in continuous lines in FIG. 2. The rear side members 8R include a right rear side member 18R and a left rear side member 18L. The right rear side member 18R and the left rear side member 18L have shapes generally symmetric in the right-left direction. The present specification mainly deals with the shape of the left rear side member 18L, but the right rear side member 18R also has a shape similar to that of the left rear side member 18L.

Distal ends of the rear side members 8R extending in the vehicle front-rear direction are connected to a rear bumper reinforcement 9. The rear bumper reinforcement 9 extends in the right-left direction (that is, the up-down direction on the plane of paper of FIG. 2) such that the rear side members 8R are connected to the rear bumper reinforcement 9. Although not illustrated herein, the rear bumper reinforcement 9 is covered with a rear bumper made of synthetic resin. When the vehicle 100 (see FIG. 1) has a rear end collision, a collision load F1 of the rear end collision is transmitted dispersedly to each of the rear side members 8R via the rear bumper reinforcement 9. This makes it possible to prevent part of the vehicle 100 from locally deforming at the rear end collision. As a result, it is possible to reduce damage to the motor 10, the battery 5, and so on.

Figure 3:
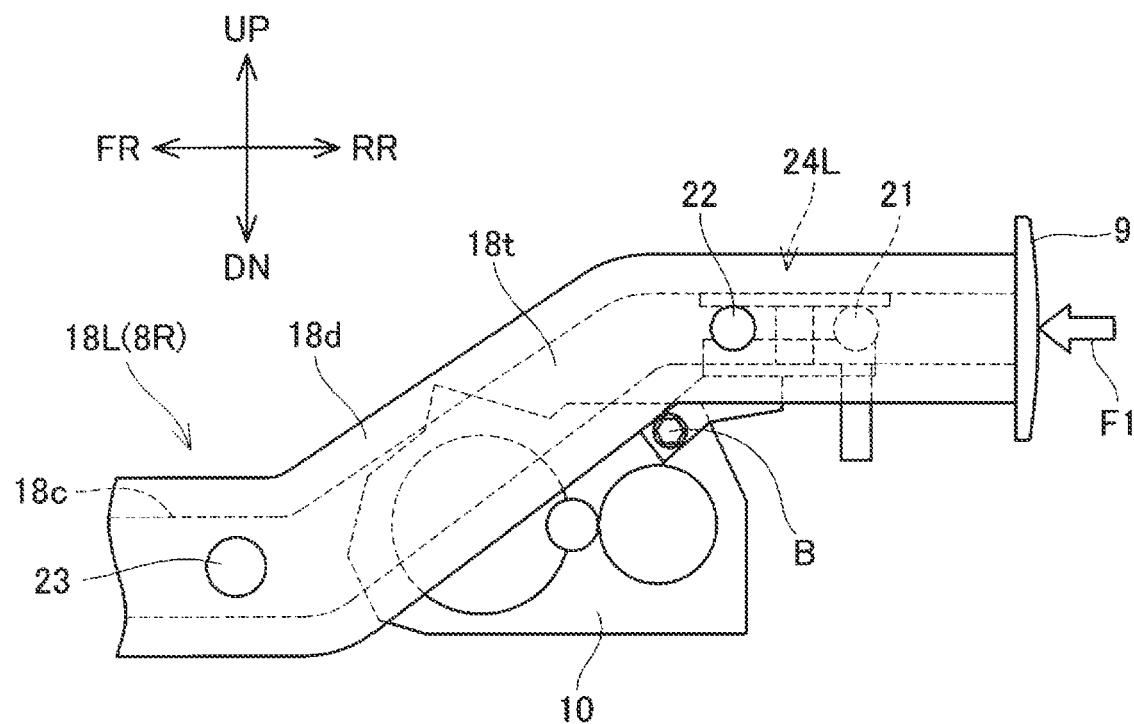
FIG. 3 illustrates a side view around a motor of the vehicle according to the embodiment.

Further, as illustrated in FIG. 3, the left rear side member 18L out of the rear side members 8R includes an inclined portion 18t. The inclined portion 18t is inclined upward in the vehicle up-down direction toward the rear side in the vehicle front-rear direction (that is, toward the right side on the plane of paper of FIG. 3). The left rear side member 18L extends in the front-rear direction in front of and behind the inclined portion 18t. A distal end of the left rear side member 18L is connected to the rear bumper reinforcement 9, above the motor 10. As has been described earlier, when the vehicle 100 (see FIG. 1) has a rear end collision, the collision load F1 directed forward is applied to the rear bumper reinforcement 9. The collision load F1 is transmitted to the left rear side member 18L (that is, the rear side members 8R) via the rear bumper reinforcement 9. Although details will be described with reference to FIGS. 5, 6, the left rear side member 18L has a sectional shape closed by a side member inner 18c placed on the inner side in the vehicle right-left direction (that is, on the deep side on the plane of paper of FIG. 3), and a side member outer 18d placed on the outer side in the vehicle right-left direction (that is, on the near side on the plane of paper of FIG. 3). Accordingly, the rear side members 8R can hardly deform relative to a load in the vehicle front-rear direction. However, the inclined portions 18t are inclined to the collision load F1 directed forward. On this account, the inclined portions 18t easily deform in the front-rear direction due to the collision load F1 as compared to respective parts, of the rear side members 8R, that extend along the front-rear direction. When the rear side members 8R deform at the inclined portions 18t, the rear side members 8R can absorb more collision energy at the rear end collision.

Figure 2:
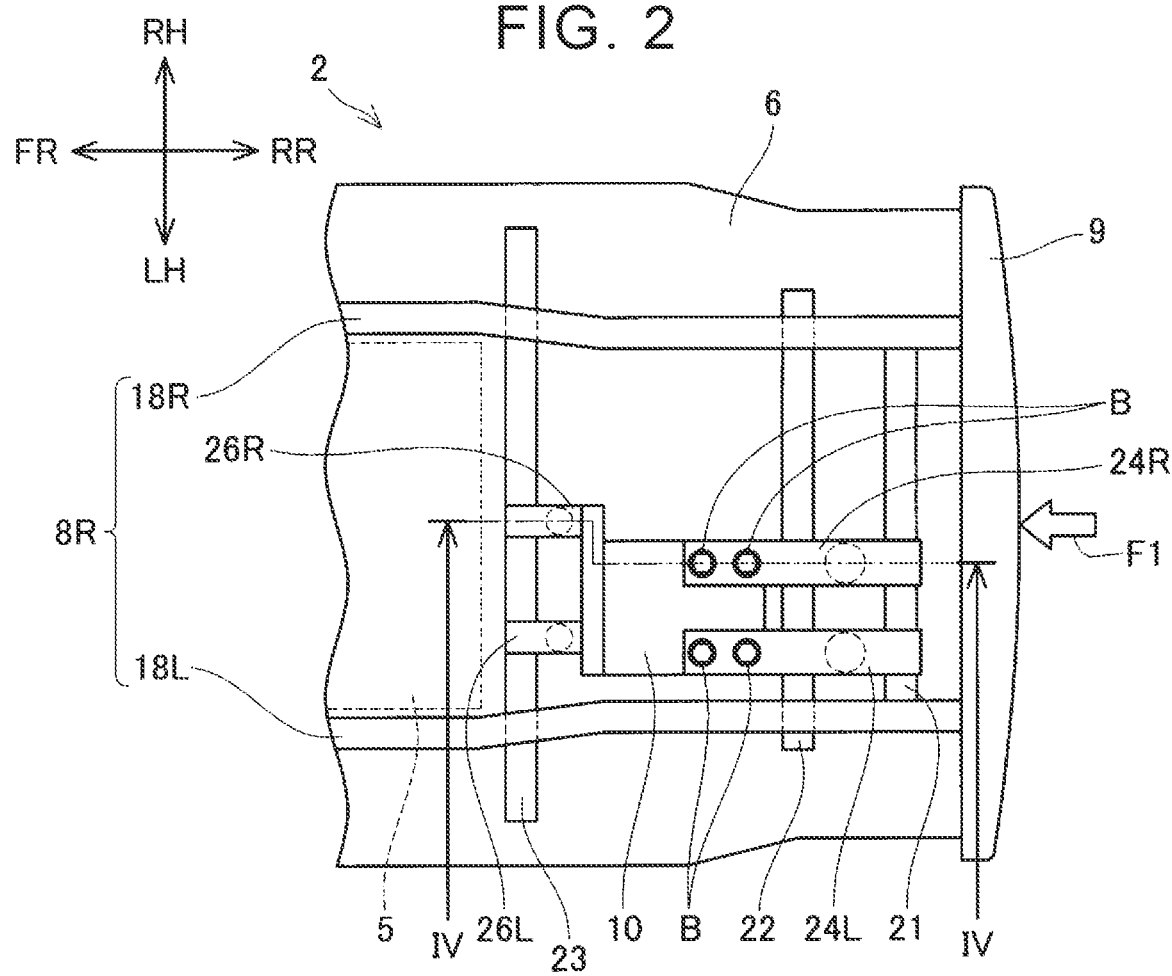
FIG. 2 illustrates a plan view of a vehicle body in a rear part of the vehicle according to the embodiment.

As illustrated in FIG. 2 as a plan view, the motor 10 is placed between the rear side members 8R. That is, when the rear side members 8R are viewed from above in the vehicle up-down direction, the rear side members 8R are placed on the opposite sides across the motor 10 in the vehicle right-left direction. The rear side members 8R are connected to each other via a first crossmember 21, a second crossmember 22, and a third crossmember 23. The crossmembers 21, 22, 23 extend in the right-left direction (that is, in the up-down direction on the plane of paper of FIG. 2). As illustrated in the sectional view of FIG. 4, the crossmembers 21, 22, 23 have a hollow circular sectional shape and extend in the right-left direction with a constant section. The crossmembers 21, 22, 23 are each constituted by a pipe material made of a steel sheet. Hereby, it is possible to simplify a metal die or the like for forming the crossmembers 21, 22, 23. That is, when the crossmembers 21, 22, 23 are each constituted by a pipe material, the crossmembers 21, 22, 23 can be formed relatively easily.

Among the crossmembers 21, 22, 23, the first crossmember 21 is placed on the rearmost side in the vehicle front-rear direction (that is, on the right side on the plane of paper of FIG. 2). In other words, among the crossmembers 21, 22, 23, the first crossmember 21 is placed closest to the distal ends of the rear side members 8R. The second crossmember 22 is placed in front of the first crossmember 21. The motor 10 is placed in front of the second crossmember 22. That is, the second crossmember 22 can extend in the vehicle right-left direction at a position closer to the motor 10 than the first crossmember 21. The third crossmember 23 is provided in front of the motor 10 and extends in the vehicle right-left direction. Details of a structure for connecting the crossmembers 21, 22, 23 to the rear side members 8R will be described later with reference to FIGS. 5, 6.

The first crossmember 21 and the second crossmember 22 are connected to the motor 10 via a first right bracket 24R and a first left bracket 24L. The first right bracket 24R has the same shape as the first left bracket 24L. The first right bracket 24R and the first left bracket 24L extend forward in the vehicle front-rear direction from the first crossmember 21 across the second crossmember 22. The first right bracket 24R and the first left bracket 24L are each fixed to the motor 10 by two bolts B from above in the vehicle up-down direction (that is, from the near side on the plane of paper of FIG. 2).

Figure 4:
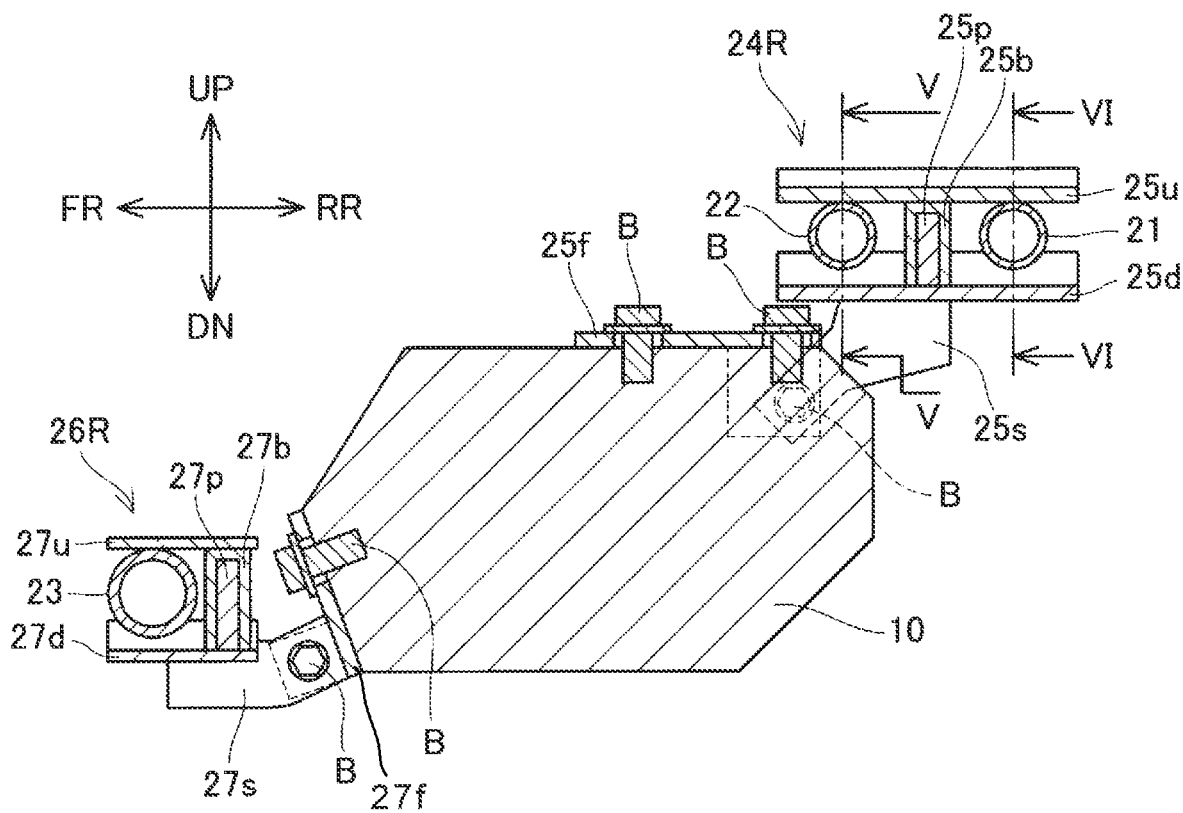
FIG. 4 illustrates a sectional view taken along a line IV-IV in FIG. 2.

As illustrated in FIG. 4, the first right bracket 24R includes a first bracket upper 25u, a first bracket lower 25d, a first bracket side 25s, and a first fixing portion 25f. The first bracket upper 25u is provided above the first crossmember 21 and the second crossmember 22 and extends in the front-rear direction (that is, in the right-left direction on the plane of paper of FIG. 4). The first bracket lower 25d is provided below the first crossmember 21 and the second crossmember 22 and extends in the front-rear direction. A boss 25b extending toward the first bracket lower 25d is provided on a lower face of the first bracket upper 25u. A pin 25p extending toward the first bracket upper 25u is provided on a top face of the first bracket lower 25d. As illustrated in FIG. 4, the boss 25b of the first bracket upper 25u is fitted to the pin 25p of the first bracket lower 25d. Hereby, the first bracket upper 25u and the first bracket lower 25d are fixed, so that the first crossmember 21 and the second crossmember 22 are sandwiched therebetween.

Further, the first bracket side 25s is provided on a lower face of the first bracket lower 25d. The first bracket side 25s extends from the lower face of the first bracket lower 25d toward a right side face (that is, on the deep side of the plane of paper of FIG. 4) of the motor 10. The first fixing portion 25f bends from a top face of the motor 10 and abuts with the right side face of the motor 10. In a state where the first bracket side 25s abuts with a right side face of the first fixing portion 25f thus bending, the first bracket side 25s is fixed, by a bolt B, to the motor 10 together with the first fixing portion 25f from the right side. As has been described earlier, the first fixing portion 25f is fixed to the top face of the motor 10 by the two bolts B. Thus, the motor 10 is connected to the first crossmember 21 and the second crossmember 22 via the first right bracket 24R.

As illustrated in FIG. 3, the third crossmember 23 is connected to the motor 10 via a third right bracket 26R and a third left bracket 26L. The third right bracket 26R and the third left bracket 26L extend rearward in the vehicle front-rear direction from the third crossmember 23 such that they are connected to the motor 10.

As illustrated in FIG. 4, the third right bracket 26R includes a third bracket upper 27u, a third bracket lower 27d, a third bracket side 27s, and a third fixing portion 27f. The third bracket upper 27u is provided above the third crossmember 23 and extends in the front-rear direction (that is, in the right-left direction on the plane of paper of FIG. 4). The third bracket lower 27d is provided below the third crossmember 23 and extends in the front-rear direction. A boss 27b extending toward the third bracket lower 27d is provided on a lower face of the third bracket upper 27u. A pin 27p extending toward the third bracket upper 27u is provided on a top face of the third bracket lower 27d. As illustrated in FIG. 4, the boss 27b of the third bracket upper 27u is fitted to the pin 27p of the third bracket lower 27d. Hereby, the third bracket upper 27u and the third bracket lower 27d are fixed to each other, so that the third crossmember 23 is sandwiched therebetween.

Further, the third bracket side 27s is provided on a lower face of the third bracket lower 27d. The third bracket side 27s extends from the lower face of the third bracket lower 27d toward a front face of the motor 10. The third fixing portion 27f is fixed to the front face of the motor 10 by a bolt B. The third fixing portion 27f bends from the front face of the motor 10 toward the third bracket side 27s. The third fixing portion 27f is fixed to the third bracket side 27s by a bolt B. Thus, the motor 10 is connected to the third crossmember 23 via the third right bracket 26R.

As has been described earlier, the second crossmember 22 extends in the vehicle right-left direction (that is, in the direction from the near side to the deep side on the plane of paper of FIG. 4) at a position closer to the motor 10 than the first crossmember 21. Accordingly, when the motor 10 vibrates at the time when the vehicle 100 (see FIG. 1) is traveling, for example, displacement and vibration of the motor 10 are more largely transmitted to the second crossmember 22 than to the first crossmember 21.

Figure 5:
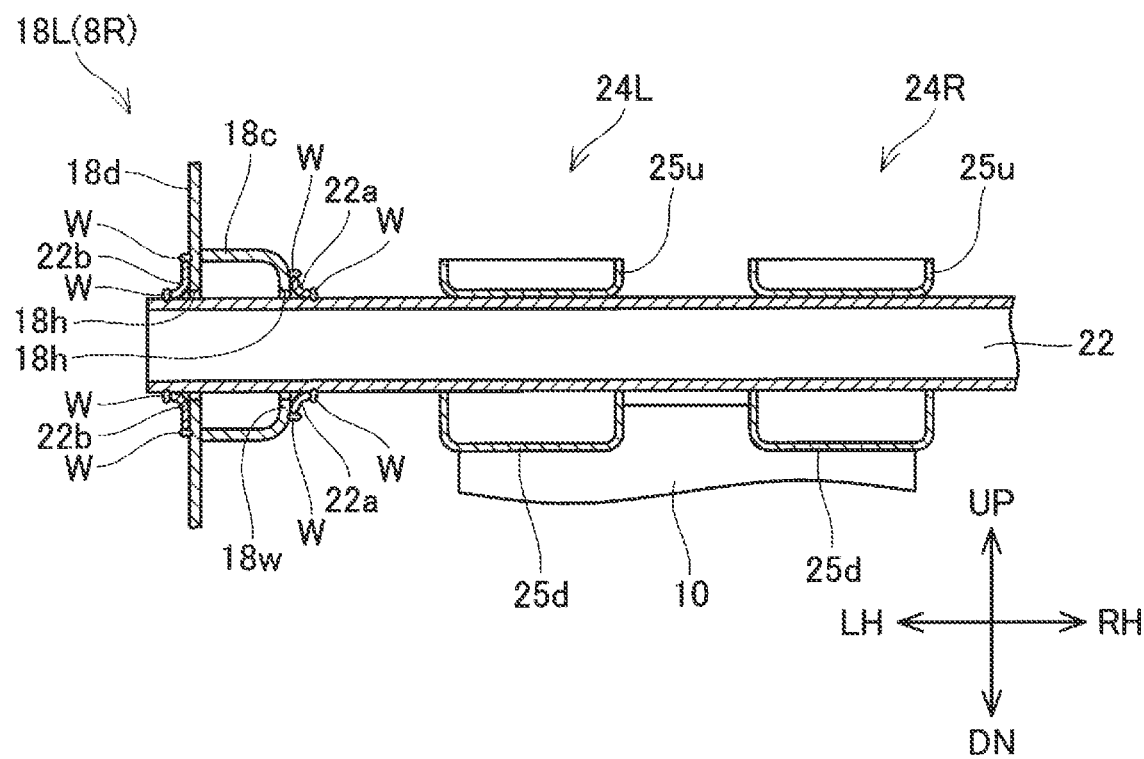
FIG. 5 illustrates a sectional view taken along a line V-V in FIG. 4.

As illustrated in FIG. 5, the second crossmember 22 penetrates through the side member inner 18c and the side member outer 18d of the left rear side member 18L and extends to outside the left rear side member 18L (that is, to the left side on the plane of paper of FIG. 5). More specifically, the second crossmember 22 passes through a through-hole 18h of the inner wall 18w of the side member inner 18c and further passes through a through-hole 18h of the side member outer 18d. The second crossmember 22 is joined to the side member inner 18c via a second inner patch 22a. The second inner patch 22a is welded to the second crossmember 22 along an outer peripheral surface of the second crossmember 22 and is welded to the side member inner 18c along an opening of the through-hole 18h. With such a configuration, at the time when the second crossmember 22 is welded to the side member inner 18c, it is not necessary to directly weld an edge of the opening of the through-hole 18h of the side member inner 18c to the outer peripheral surface of the second crossmember 22. As a result, the outside diameter of the through-hole 18h of the side member inner 18c can be set to a size including assembling variations of the second crossmember 22 or the like. Similarly, the second crossmember 22 is joined to the side member outer 18d via an outer patch 22b. The outer patch 22b is welded to the second crossmember 22 along the outer peripheral surface of the second crossmember 22 and is welded to the side member outer 18d along an opening of the through-hole 18h. Note that FIG. 5 illustrates a structure for joining the second crossmember 22 to the left rear side member 18L. However, this also applies to a structure for joining the second crossmember 22 to the right rear side member 18R (see FIG. 2).

As described above, in the vehicle 100 (see FIG. 1) of the present embodiment, the second crossmember 22 placed at a position close to the motor 10 is joined such that the second crossmember 22 penetrates through the inner walls 18w of the side member inners 18c and the side member outers 18d of the rear side members 8R. Hereby, the second crossmember 22 that is easily affected by the vibration of the motor 10 is fixed firmly to the rear side members 8R. As a result, the rigidity of the vehicle body 2 near the motor 10, including the second crossmember 22, increases, and the motor 10 is held firmly by the vehicle body 2 (see FIG. 1).

Further, although not illustrated herein, the third crossmember 23 placed in front of the motor 10 is also joined such that the third crossmember 23 penetrates through the rear side members 8R. As has been described earlier, when the vehicle 100 has a rear end collision, the collision load F1 (see FIG. 3) of the rear end collision is applied from the rear side in the vehicle front-rear direction. On this account, the third crossmember 23 placed in front of the motor 10 in the vehicle front-rear direction hardly affects deformation of the vehicle body 2 due to the collision load F1. Since the third crossmember 23 is joined such that the third crossmember 23 penetrates through the rear side members 8R, the motor 10 is held further firmly by the vehicle body 2 (see FIG. 1).

In the meantime, as illustrated in FIG. 4, the first crossmember 21 extends in the vehicle right-left direction (that is, in the direction from the near side to the deep side on the plane of paper of FIG. 4) at a position farther from the motor 10 than the second crossmember 22. Accordingly, the first crossmember 21 can be hardly affected by vibration and displacement of the motor 10. The second crossmember 22 prevents positional deviations of the first right bracket 24R and the first left bracket 24L (see FIG. 2) to be caused behind the first crossmember 21 (that is, on the right side on the plane of paper of FIG. 4) in the vehicle front-rear direction at the time when the vehicle 100 is traveling. More specifically, the second crossmember 22 prevents the first right bracket 24R and the first left bracket 24L from rotating around the first crossmember 21 due to vibrations at the time when the vehicle 100 is traveling. Hereby, the positions of the first right bracket 24R and the first left bracket 24L are not displaced at the time when the vehicle 100 is traveling, thereby making it possible to restrain vibration of the motor 10. That is, the motor 10 is held further firmly by the vehicle body 2 (see FIG. 1). The first crossmember 21 does not receive as large vibration as that transmitted to the second crossmember 22. In other words, the vicinity of the first crossmember 21 in the vehicle body 2 is not required to have as high rigidity as that in the vicinity of the second crossmember 22.

Figure 6:
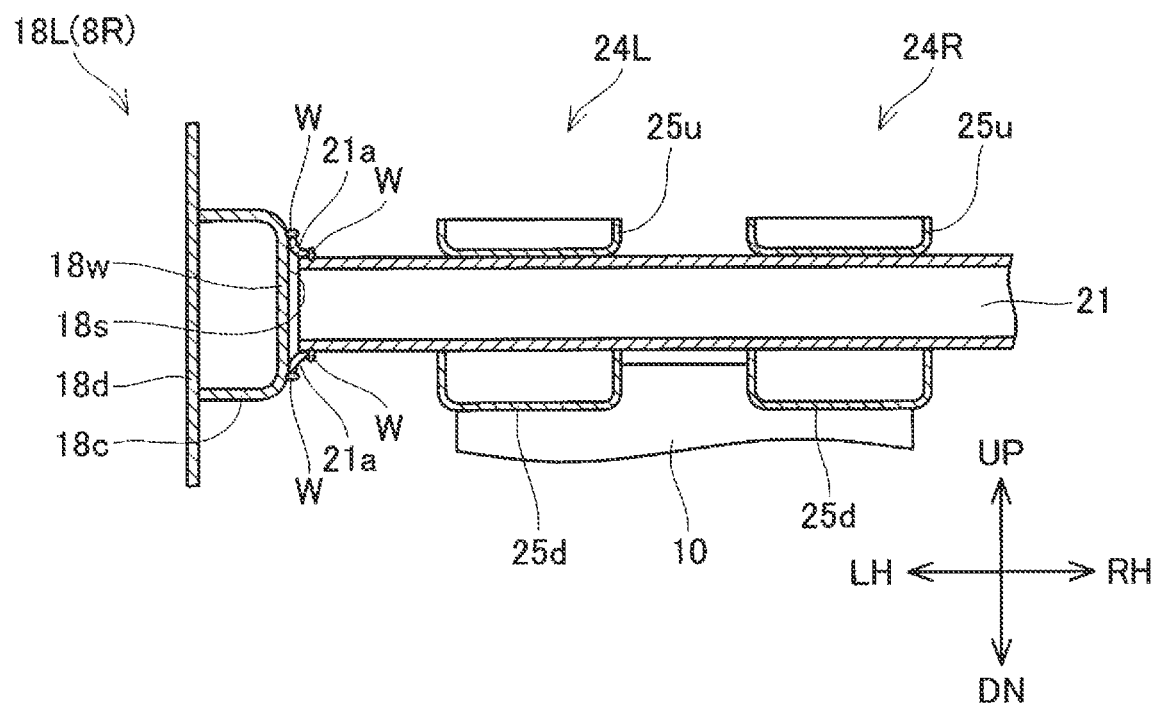
FIG. 6 illustrates a sectional view taken along a line VI-VI in FIG. 4.

As illustrated in FIG. 6, differently from the second crossmember 22 described above, the first crossmember 21 is joined to a surface 18s of the inner wall 18w of the side member inner 18c. More specifically, an outer distal end (that is, on the left side on the plane of paper of FIG. 6) of the first crossmember 21 in the vehicle right-left direction is welded to the surface 18s of the inner wall 18w via a first inner patch 21a. Note that this also applies to a structure for joining the first crossmember 21 to the right rear side member 18R (see FIG. 2).

As illustrated in FIG. 6, the first crossmember 21 is supported only by a weld mark W formed between the first inner patch 21a and the surface 18s. On the other hand, the second crossmember 22 is supported also by an inner peripheral surface of the through-hole 18h of the side member inner 18c in addition to a weld mark W formed between the second inner patch 22a and the surface 18s, as illustrated in FIG. 5. As such, the connection strength of the first crossmember 21 to the left rear side member 18L is restrained as compared to the second crossmember 22.

Further, the second crossmember 22 penetrates through the through-hole 18h of the side member outer 18d. On this account, when the vehicle 100 has a rear end collision, the second crossmember 22 is further supported by a weld mark W formed between the outer patch 22b and the side member outer 18d and by the inner peripheral surface of the through-hole 18h of the side member outer 18d. Accordingly, the connection strength of the second crossmember 22 to the left rear side member 18L is further improved as compared to the first crossmember 21.

As described above, in the vehicle 100 (see FIG. 1) of the present embodiment, the connection strength of the first crossmember 21 to the rear side members 8R is restrained, the first crossmember 21 extending in the right-left direction at a position farther from the motor 10. Meanwhile, in the vehicle 100, the connection strength of the second crossmember 22 to the rear side members 8R is improved, the second crossmember 22 extending in the right-left direction at a position closer to the motor 10. That is, the vehicle body 2 includes a part having a decreased strength and placed in the vicinity of the first crossmember 21, and a part having an improved strength and placed in the vicinity of the second crossmember 22. Hereby, when the vehicle 100 has a rear end collision, a stress focuses on the part having a decreased strength and placed in the vicinity of the first crossmember 21, so that the part placed in the vicinity of the first crossmember 21 deforms. The vehicle body 2 deforms such that a space, in the vehicle front-rear direction, between the first crossmember 21 and the second crossmember 22 becomes small. As a result, it is possible to absorb more collision energy. Hereby, collision energy to be transmitted to the motor 10 is reduced. Further, during traveling of the vehicle 100, it is possible to firmly hold the motor 10 by the part having an improved strength and placed in the vicinity of the second crossmember 22.

The embodiment has been described in detail, but the embodiment is only an example and does not limit the scope of Claims. The technology described in the scope of the claims includes the foregoing example with various modifications and changes. The following describes modifications of the above embodiment.

Modification 1

In the above embodiment, the second crossmember 22 penetrates through the side member outers 18d of the rear side members 8R. Instead of this, in Modification 1, the second crossmember 22 may not penetrate through the side member outers 18d. In this case, the distal ends of the second crossmember 22 may be welded to respective inner surfaces of the side member outers 18d.

Modification 2

In the above embodiment, the crossmembers 21, 22, 23 are each constituted by a pipe material made of a steel sheet. Instead of this, in Modification 2, at least one crossmember out of the crossmembers 21, 22, 23 may be made of a sheet metal having a rectangular section, for example.

Modification 3

In the above embodiment, the vehicle body 2 includes the third crossmember 23 in front of the motor 10. Instead of this, in Modification 3, the vehicle body 2 that does not include the third crossmember 23 may be employed.

Modification 4

In the above embodiment, the rear side members 8R include the inclined portions 18t. Instead of this, in Modification 4, the rear side members 8R may not include the inclined portions 18t. In this case, the second crossmember 22 may be placed below the motor 10.

The specific example of the present disclosure has been described in detail. However, the example is for illustration only, and does not limit the scope of the claims. The technology described in the scope of the claims includes the foregoing example with various modifications and changes. Each of and various combinations of the technical elements described in this specification and the drawings achieve technical utility, and the technical elements are not limited to the combination stated in the claims at the time of filing. The technology described in this specification and the drawings as an example is able to achieve the plurality of objectives simultaneously and has technical utility by achieving one of the objectives.

What is claimed is:

1. A vehicle comprising:
a vehicle body; and
a mounted component provided in the vehicle body, the mounted component is a motor configured to drive the vehicle, wherein:
the vehicle body includes:
a pair of side members extending in a vehicle front-rear direction, the side members being provided on opposite sides across the mounted component in a vehicle right-left direction when the side members are viewed from above in a vehicle up-down direction, the side members are provided as a pair of rear side members placed in a rear part of the vehicle,
a first crossmember extending in the vehicle right-left direction such that the first crossmember is joined to surfaces of respective inner walls of the side members,
a second crossmember extending in the vehicle right-left direction at a position closer to the mounted component than the first crossmember such that the second crossmember penetrates through the respective inner walls,
a bracket via which the mounted component is connected to the first crossmember and the second crossmember, and
a third crossmember extending in the vehicle right-left direction in front of the motor in the vehicle front-rear direction such that the side members are connected to each other via the third crossmember, the third crossmember is made of a pipe material and is provided to penetrate through the respective inner walls.

2. The vehicle according to claim 1, wherein the second crossmember extends to respective outer walls of the side members such that the second crossmember is joined to the respective outer walls.

3. The vehicle according to claim 1, wherein the second crossmember is made of a pipe material.

4. The vehicle according to claim 1, wherein the first crossmember is made of a pipe material.

5. The vehicle according to claim 1, wherein:
each of the side members includes an inclined area that is an area inclined upward toward a rear side in the vehicle front-rear direction;
the third crossmember is placed in front of the inclined area in the vehicle front-rear direction;
the second crossmember is placed behind the inclined area in the vehicle front-rear direction and placed above the motor; and
the first crossmember is placed behind the second crossmember in the vehicle front-rear direction.

6. A vehicle comprising:
a vehicle body; and
a mounted component provided in the vehicle body, the mounted component is a motor configured to drive the vehicle, wherein:
the vehicle body includes:
a pair of side members extending in a vehicle front-rear direction, the side members being provided on opposite sides across the mounted component in a vehicle right-left direction when the side members are viewed from above in a vehicle up-down direction, the side members are provided as a pair of rear side members placed in a rear part of the vehicle,
a first crossmember extending in the vehicle right-left direction such that the first crossmember is joined to surfaces of respective inner walls of the side members,
a second crossmember extending in the vehicle right-left direction at a position closer to the mounted component than the first crossmember such that the second crossmember penetrates through the respective inner walls, a bracket via which the mounted component is connected to the first crossmember and the second crossmember, and a third crossmember extending in the vehicle right-left direction in front of the motor in the vehicle front-rear direction such that the side members are connected to each other via the third crossmember, each of the side members includes an inclined area that is an area inclined upward toward a rear side in the vehicle front-rear direction;

the third crossmember is placed in front of the inclined area in the vehicle front-rear direction;

the second crossmember is placed behind the inclined area in the vehicle front-rear direction and placed above the motor; and the first crossmember is placed behind the second crossmember in the vehicle front-rear direction.

\* \* \* \* \*